United States Patent

Shido et al.

[11] Patent Number: 6,040,848
[45] Date of Patent: Mar. 21, 2000

[54] INFORMATION RECORDING APPARATUS AND METHOD OF RECORDING INFORMATION BY APPLYING VOLTAGE BETWEEN PROBE AND RECORDING MEDIUM

[75] Inventors: Shunichi Shido, Zama; Ryo Kuroda, Kawasaki, both of Japan

[73] Assignee: Canon Kabushiki Kaisha, Tokyo, Japan

[21] Appl. No.: 08/944,895

[22] Filed: Oct. 6, 1997

[30] Foreign Application Priority Data

Oct. 7, 1996 [JP] Japan .................................... 8-284670

[51] Int. Cl.[7] ............................. B41J 2/385; G11B 9/00
[52] U.S. Cl. ........................................... 347/159; 369/126
[58] Field of Search ..................... 347/153, 159, 347/112, 199, 247, 237, 262, 264, 128, 5, 19; 219/384; 346/150.2; 250/306; 369/126; 324/758; 358/504, 299, 301

[56] References Cited

U.S. PATENT DOCUMENTS

| 4,896,044 | 1/1990 | Li et al. ................................. | 347/159 |
| 5,222,060 | 6/1993 | Kuroda et al. ......................... | 369/126 |
| 5,282,191 | 1/1994 | Yamano et al. ........................ | 369/126 |
| 5,289,455 | 2/1994 | Kuroda et al. ......................... | 369/126 |
| 5,299,184 | 3/1994 | Yamano et al. ........................ | 369/126 |
| 5,329,122 | 7/1994 | Sakai et al. ............................ | 250/306 |
| 5,375,114 | 12/1994 | Hatanaka et al. ...................... | 369/126 |
| 5,412,641 | 5/1995 | Shinjo et al. .......................... | 369/126 |
| 5,446,720 | 8/1995 | Oguchi et al. ......................... | 369/126 |
| 5,550,479 | 8/1996 | Wakana et al. ........................ | 324/758 |
| 5,732,053 | 3/1998 | Yano et al. ............................ | 369/126 |
| 5,757,760 | 5/1998 | Shido et al. ........................... | 369/126 |
| 5,777,977 | 7/1998 | Fujiwara et al. ...................... | 369/126 |
| 5,805,541 | 9/1998 | Takeda et al. ......................... | 369/126 |

FOREIGN PATENT DOCUMENTS

| 0834875 | 8/1998 | European Pat. Off. . |
| 63-161552 | 7/1988 | Japan . |
| 63-161553 | 7/1988 | Japan . |

OTHER PUBLICATIONS

G. Binnig et al., "Scanning tunneling microscopy", Helvetica Physica Acta. vol. 55 (1982), pp. 626–781.

*Primary Examiner*—N. Le
*Assistant Examiner*—L. Anderson
*Attorney, Agent, or Firm*—Fitzpatrick, Cella, Harper & Scinto

[57] ABSTRACT

In recording of information, a voltage is applied to between a probe and a recording medium. A capacitor stores charges from a DC power supply. A switch is provided so as to disconnect the capacitor and the DC power supply. When information is to be recorded, the capacitor and the DC power supply are disconnected from each other by the switch and the charges stored in the capacitor are output to the probe or recording medium.

4 Claims, 6 Drawing Sheets

INFORMATION RECORDING APPARATUS AND METHOD OF RECORDING INFORMATION BY APPLYING VOLTAGE BETWEEN PROBE AND RECORDING MEDIUM

BACKGROUND OF THE INVENTION

1. Field of the Invention

The present invention relates to an information recording apparatus and method which use a physical phenomenon caused by applying a voltage between a probe and a sample while they are kept close to each other.

2. Description of the Related Art

Recently, a scanning tunneling microscope (to be referred to as an STM hereinafter) has been developed (G. Binning et al., Helvetica Physica Acta, 55, 726 (1982)), which allows direct observation of electron structures on and near the surface of a substance by using a physical phenomenon (tunnel effect or the like) appearing when a probe is brought close to a sample. With this microscope, actual spatial images of single crystals and amorphous substances can be measured with high resolutions.

In addition, the STM allows observation with low power without causing damage due to currents to a medium. Furthermore, the STM can operate in the atmosphere and in a solution as well as in an ultra-high vacuum, and can be used for various types of materials. A variety of applications of the STM are therefore expected in various academic and research fields.

In the industrial field as well, attention has recently been given to the principle of the STM having a spatial resolution at an atomic or molecular level efforts have been made to apply the STM to information recording/reproducing apparatuses using a medium having a recording medium and to put it into practical use, as disclosed in Japanese Laid-Open Patent Applications Nos. 63-161552 and 63-161553.

In these conventional methods, an SOAZ·Langmuir-Blodgett (LB) film stacked on an Au electrode is used as a recording medium.

In a recording operation, a voltage on which a pulse wave is superimposed by using a bias applying circuit between the probe and the medium is applied between the sample and the probe.

In a reproducing operation, while a predetermined DC voltage is applied between the probe and the medium, the medium surface is scanned with the probe to detect current changes.

Figure 1:
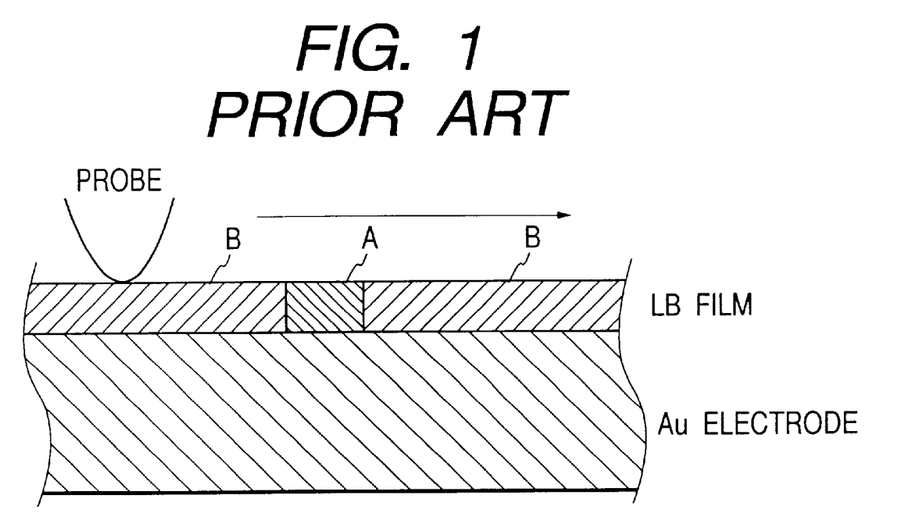
FIG. 1 is a sectional view schematically showing a bit recording operation.

For example, by this method, a low-resistance portion A is formed in a high-resistance LB film on the medium, as schematically shown in FIG. 1.

Assume that in a reproducing operation, a predetermined DC voltage is applied to the Au electrode, and a current flowing through the probe is measured. In this case, almost no current flows while the probe is scanning/moving over a high-resistance portion, but the current value abruptly increases when the probe moves across the recorded bit portion. By detecting this change in current value, the presence/absence of a bit can be detected.

As described above, data is recorded on this medium by applying a voltage pulse thereto using the probe. The peak value of the voltage applied for a recording operation must be equal to or larger than a threshold.

This threshold voltage, however, varies owing to local variations in the thickness of an organic film used as a medium, thus posing a problem.

Transition is caused by a high bias at a thick film portion, but is caused by a low bias at a thin film portion. If a pulse peak value is determined with this threshold being kept constant, no transition occurs at a thick film portion, but breakdown occurs in a thin film portion owing to an overcurrent. As a result, the probability of forming stable bits decreases.

If, for example, a sufficiently high voltage is determined as a peak value in consideration of such variations in film thickness, an excessive current is applied to a bit on a portion with a small threshold. As a result, the formed bits become unstable in terms of bit shape, size, position, and the like.

Figure 2:
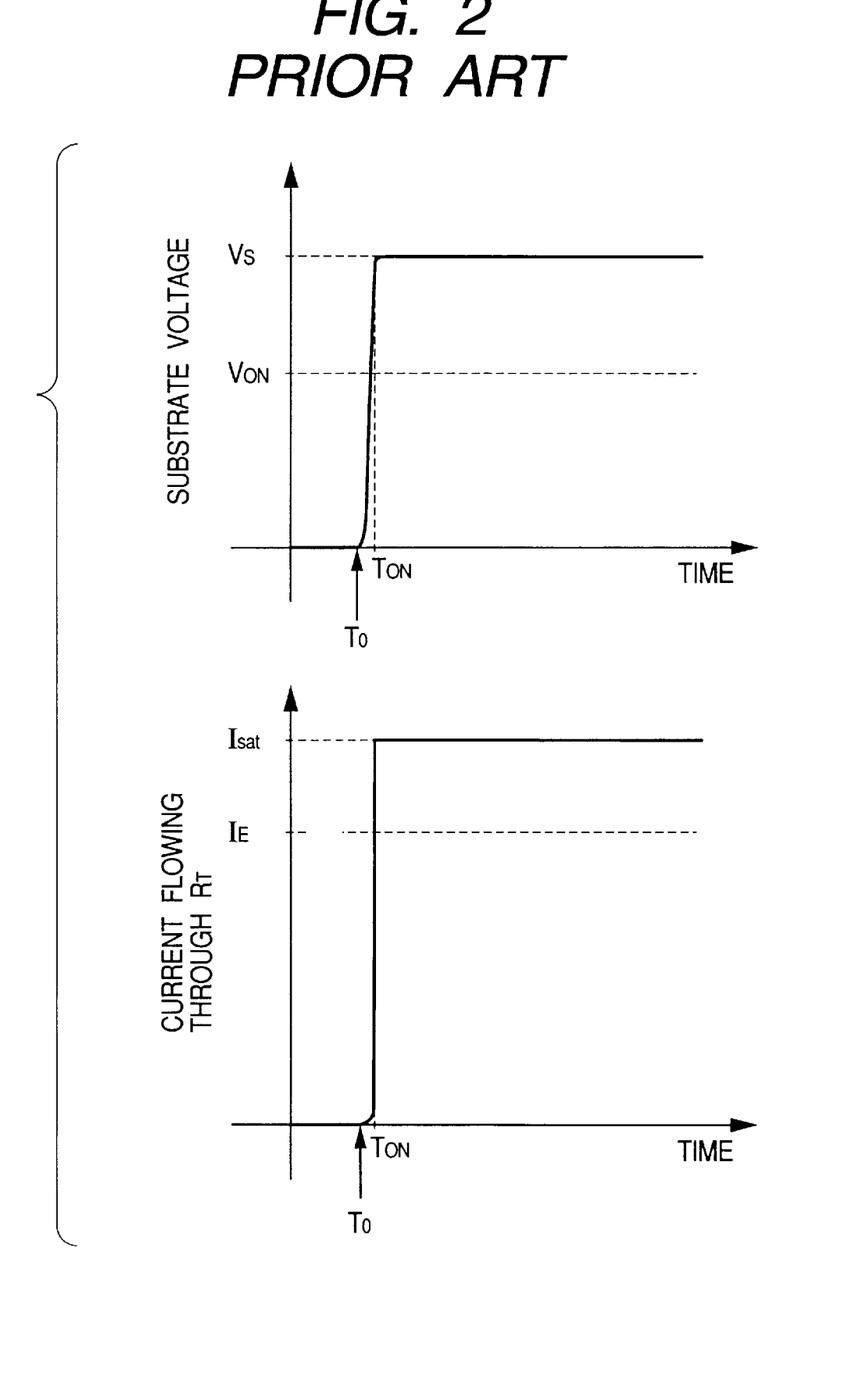
FIG. 2 is a graph showing a change in current/voltage as a function of time upon application of a rectangular pulse.

Consider the maximum current in this case. When the current is equal to or smaller than a given current value, a stable bit having a size of about 10 nm, reflecting the shape of the tip of the probe, can be obtained. When the current is larger than this current value, breakdown is caused in the medium by the current. As a result, a structure having a size of about several 100 nm is formed, with the bit shape being irrelevant to the shape of the tip of the probe. The resistance of the organic film of a portion on which a bit is recorded is smaller by 100 times or more than that of a portion on which no bit is formed. For this reason, if a given constant voltage is applied to the medium, and the voltage is not a proper value, the resistance of the voltage-applied portion decreases, and at the same time, a current flowing through a resistor $R_T$ in the medium portion abruptly increases to exceed a current threshold $I_E$ at which breakdown occurs, and reaches a saturation current value Isat, as shown in FIG. 2. As a result, a bit is formed with breakdown, exhibiting instability in terms of shape and position.

Furthermore, the error correction function, the tracking function for a read operation, and the like must be enhanced because of these problems in a recording operation, resulting in a heavy load on the system. In addition, the error rate in a recording/reproducing operation is high.

SUMMARY OF THE INVENTION

It is, therefore, an object of the present invention to provide an information recording apparatus and method which control a bias and a current flowing through a recording medium in accordance with the local characteristics of the recording medium, when information is to be recorded as a bit, so as to perform a stable recording operation in terms of bit shape and position.

In order to achieve the above object, there is provided an information recording apparatus for recording information by applying a voltage between a probe and a recording medium, comprising:

a DC power supply;

charge storage means for storing charges from the DC power supply; and a switch for disconnecting the charge storage means from the DC power supply, wherein when the information is to be recorded, the charge storage means and the DC power supply are disconnected from each other by the switch, and the charges stored in the charge storage means are output to the probe or the recording medium.

In addition, in order to achieve the above object, there is provided an information recording method of recording information by applying a voltage between a probe and a recording medium, comprising the steps of:

storing charges in charge storage means by using a DC power supply;

disconnecting the charge storage means from the DC power supply in recording the information; and forming a record bit on the recording medium by outputting the charges stored in the charge storage means to the probe or the recording medium.

The present invention will be described in detail in the following embodiment in conjunction with the accompanying drawings.

DETAILED DESCRIPTION OF THE PREFERRED EMBODIMENTS

According to the present invention, as described above, in recording information, the charges stored in the charge storage means are output to the probe or a recording medium after the charge storage means is disconnected from the DC power supply. With this arrangement, the current flowing in the medium can be controlled while the bias required to form bits is applied to the medium, thereby recording information stably in terms of the shapes and positions of the bits.

In addition, according to the present invention, since a voltage can be controlled by using only capacitors, no complicated circuit system for applying pulses is required. Assume that in a system designed to apply a bias from the probe side, a plurality of probes are prepared, and the same medium can be accessed by the probes to greatly increase the transmission rate. Even in this case, since the arrangement of the system is very simple, the process load can be reduced in manufacturing probes by a semiconductor process including micromechanics and the like. In addition, the cost of each probe can be reduced, and the mounting density of probes can be increased.

In an information recording/reproducing operation, since bits are formed stably in terms of bit shape and position, the read error rate can be reduced without using any strong tracking mechanism. In addition, no redundant bits for error correction are required, and hence the system load in an encoding/decoding operation can be reduced. Furthermore, the recording density can be increased.

The contents of the present invention will be described in detail next with reference to the accompanying drawings.

Figure 3:
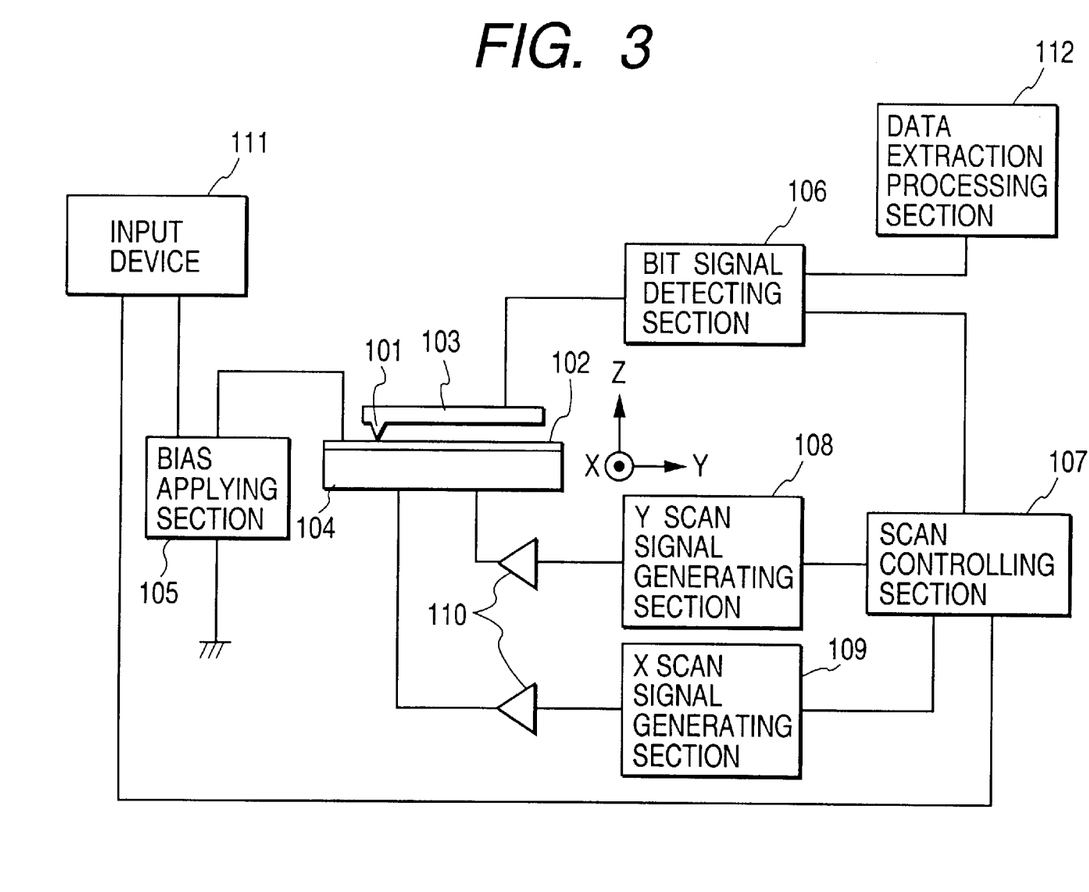
FIG. 3 is a block diagram showing the arrangement of an embodiment of the present invention.

FIG. 3 shows the basic arrangement of the present invention. Recording information is input to an input device 111 to be developed as the position information of a record bit on a medium.

A bias applying section 105 applies a predetermined voltage to a recording medium 102. A tunnel current $J_T$ is then observed between a probe 101 mounted on a cantilever 103 and the recording medium 102.

The probe 101 is brought close to the recording medium 102 by coarse and fine adjustment mechanisms with high precision until the tunnel current $J_T$ is observed, although this process is not shown in the accompanying drawings. The tunnel current $J_T$ is detected by the probe 101 and then input to a bit signal detecting section 106, which detects a bit signal from the current signal.

Figure 7:
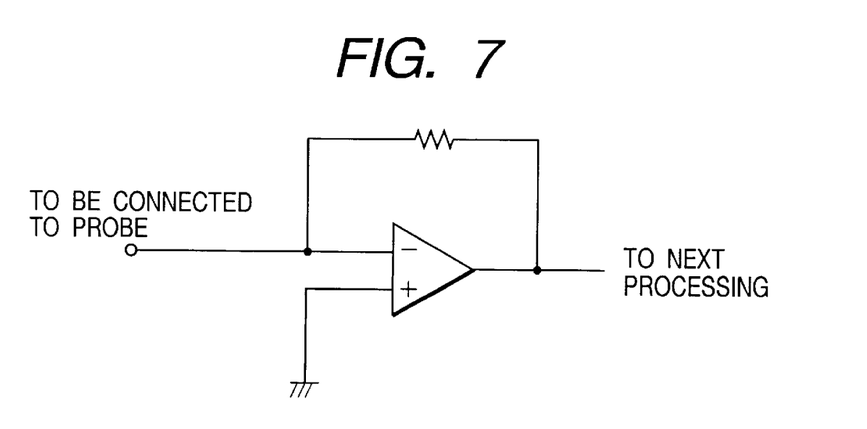
FIG. 7 is a circuit diagram showing a current/voltage conversion circuit in a bit signal detecting section.

The bit signal detecting section 106 has a current/voltage conversion circuit, like the one shown in FIG. 7, at the input portion. The tunnel current JT is converted into a voltage signal by this circuit, and the voltage signal is subjected to the subsequent processing.

Subsequently, for information reproduction, the detected bit signal is sent to a data extraction processing section 112. The signal is then reproduced as information.

The bit signal is a signal obtained by amplifying the frequency component of the bit of the detected tunnel current. The data extraction processing section 112 reproduces the recorded information from the bit detection timing of the signal and the position information of the probe on the medium.

The reproduced information is sent from the data extraction processing section 112 to an image data output section, an audio output section, or an information processing system for performing processing in accordance with the information, e.g., using the information as numerical data for a computer.

The relative positional relationship between the recording medium 102 and the probe 101 can be changed by the scanning operation of a movable stage 104.

More specifically, the movable stage 104 incorporates an actuator, and moves the recording medium in directions (X-and Y-directions) within a plane of the recording medium surface in accordance with driving signals sent from a Y-scan signal generating section 108 and an X-scan signal generating section 109 through amplifiers 110.

Each scan signal generating section (108, 109) generates a scan signal in accordance with a control signal output from a scan controlling section 107 on the basis of control information such as an offset position, a scan frequency, a main scan (X-scan) width, and a sub-scan (Y-scan) width.

The scan controlling section 107 also sends the probe position information to the input device 111. The input device 111 then calculates the recording timing of a bit from the input value, and supplies a recording control signal to the bias applying section 105.

The operation of the bias applying section 105, which is a characteristic feature of the present invention, will be described in detail next with reference to the accompanying drawings.

Figure 4:
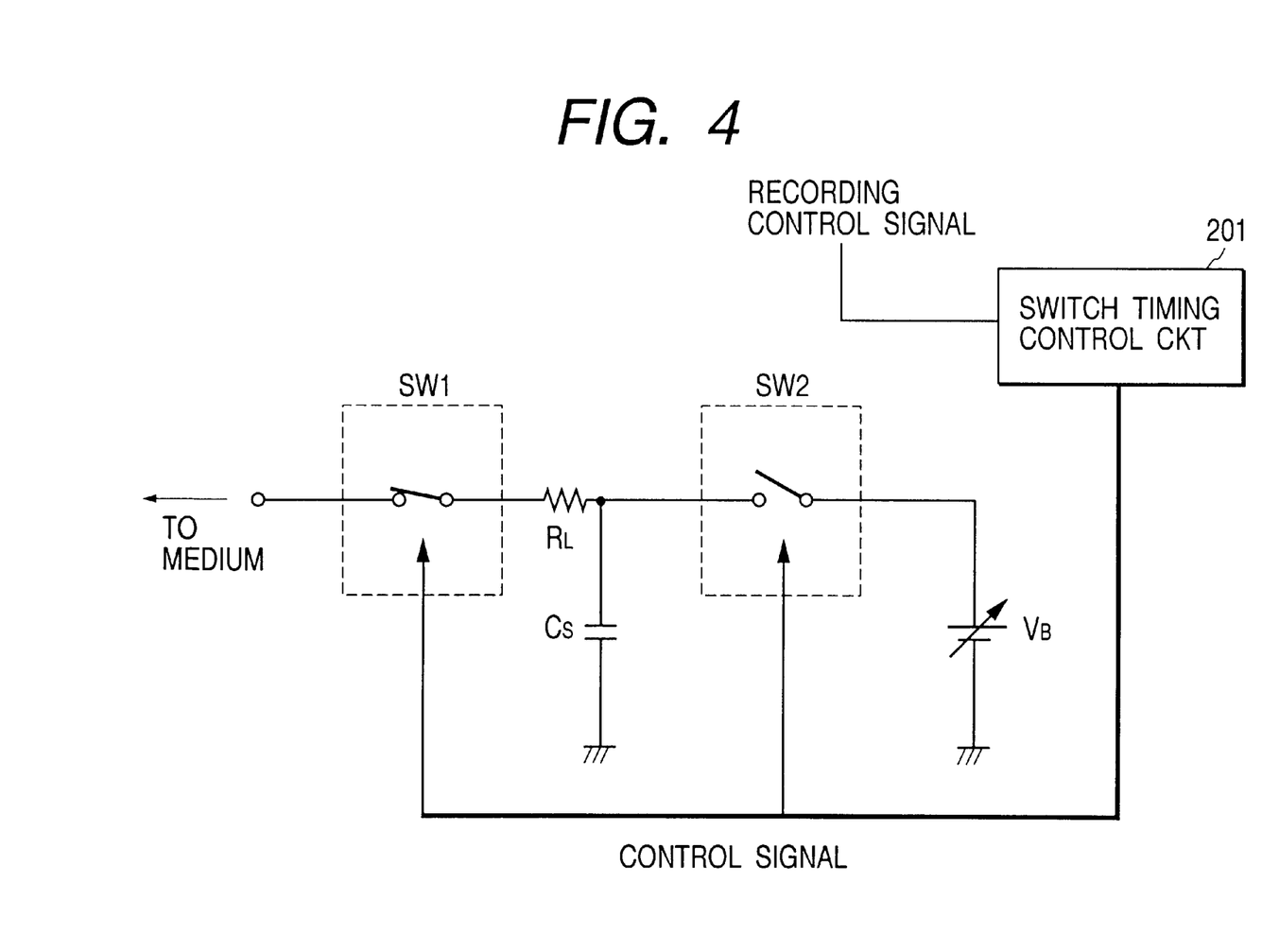
FIG. 4 is a circuit diagram showing the schematic arrangement of a bias applying section.

FIG. 4 shows the inner arrangement of the bias applying section 105. The bias applying section 105 includes switches (SW1 and SW2), a charge storage capacitor $C_s$ having a capacitance $C_s$, and a variable-output power supply $V_B$ (having an output $V_B$).

The switches SW1 and the SW2 are ON/OFF-controlled by a switch timing control circuit 201 with reference to an input recording control signal. A bias is applied from the left output terminal of SW1 to the medium.

The bias applying section 105 also includes a line resistor or a limiting resistor $R_L$ for determining the leading edge of an applied pulse.

The operation of this bias applying section 105 will be described in detail next.

First of all, the following steps 1 to 4 indicate control on SW1 and SW2 and the flow of charges.

Assume that both SW1 and SW2 are in the OFF state according to the initial setting.

step 1: SW2 is turned on; charges are stored in the charge storage capacitor $C_S$ by the power supply set at the predetermined bias $V_B$.

step 2: SW2 is turned off; the power supply is disconnected.

step 3: SW1 is turned on; the charge storage capacitor $C_S$ is connected to the medium when the probe is set at a designated position (recording position), and a voltage is applied through the resistor $R_L$.

step 4: SW1 is turned off; the charge storage capacitor $C_S$ is disconnected.

The above four steps are cyclically repeated to apply a bit recording pulse.

The electrical behavior of the system in an actual pulse applying operation will be described next.

In step 1, a charge $C_S V_B$ is stored in the charge storage capacitor $C_S$. In step 2, no electrical change occurs.

At this time, the probe is scanned over the medium surface to be moved to a recording position.

In step 3, a pulse is actually applied.

Figure 5:
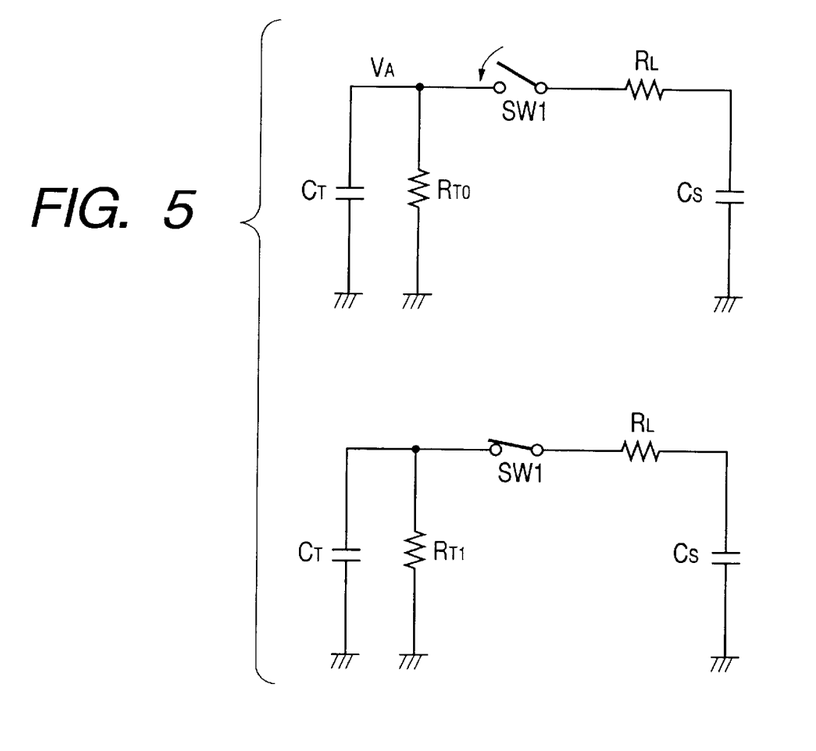
FIG. 5 is an equivalent circuit for explaining a pulse applying operation.
Figure 6:
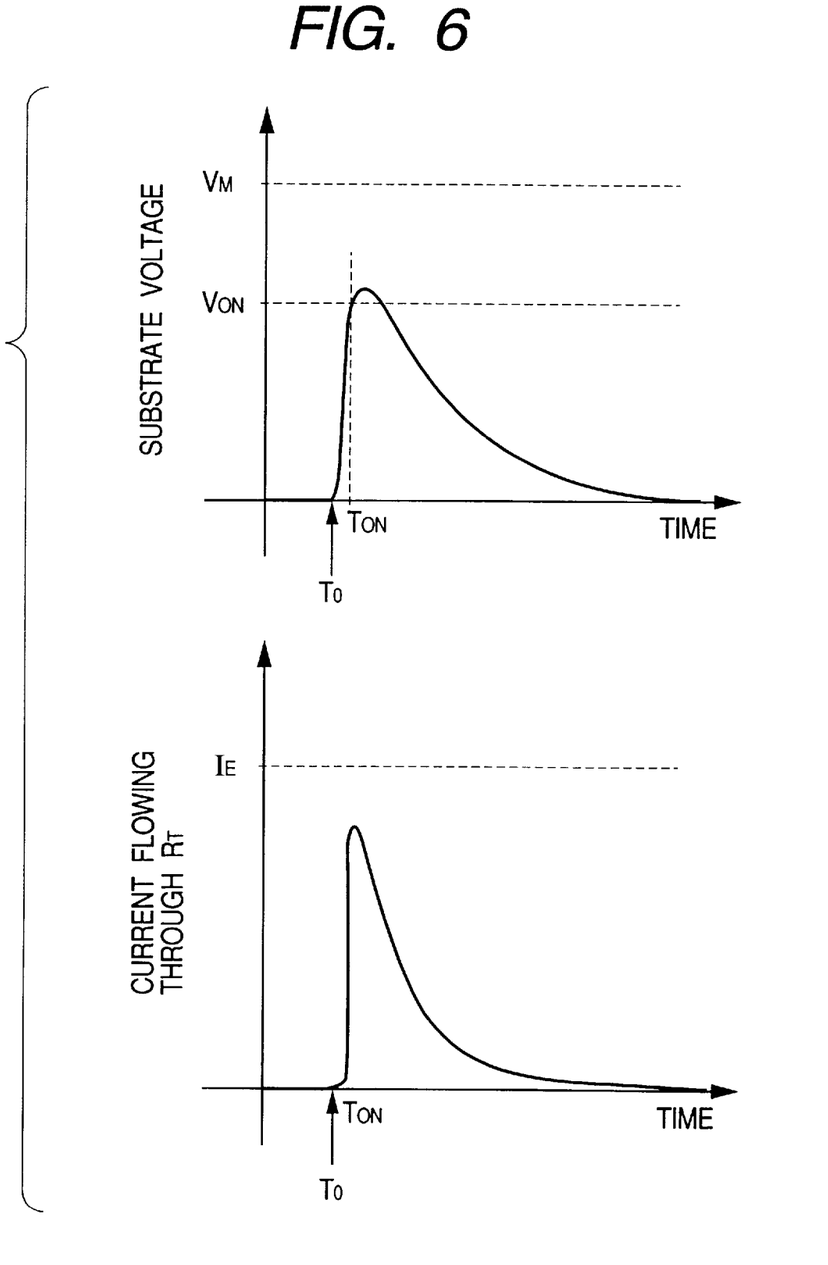
FIG. 6 is a graph showing a change in current/voltage as a function of time in a pulse applying operation using the present invention.

This operation will be described with reference to FIG. 5, which shows an equivalent circuit of the pulse applying system. Referring to FIG. 5, this circuit has a capacitance $C_T$ corresponding to the sum of the parasitic capacitances of the medium and other portions and medium resistors $R_{T0}$ and $R_{T1}$. In FIG. 5, the charge $C_S V_B$ is stored in the charge storage capacitor $C_S$. FIG. 6 shows the behaviors of a current and a voltage. When switch SW1 is closed at time $T_0$, some of the charge in the charge storage capacitor $C_S$ starts flowing into the capacitance $C_T$ through the resistor $R_L$, and a probe potential $V_A$ rises.

At this time, since the resistor $R_{T0}$ of the medium is very large, almost no conduction current flows through this portion.

When, however, the probe potential $V_A$ exceeds a given threshold voltage $V_{ON}$, which is locally present on the medium, at time $T_{ON}$, transition of the organic medium occurs, and an initial high-resistance state $R_{T0}$ shifts to a low-resistance state $R_{T1}$. As a result, the conduction current flowing through this resistor portion abruptly increases. Since the stored charge is discharged by this current, the rise in the probe voltage $V_A$ is slowed down.

Although a large current temporarily flows, since this current value flows in accordance with the probe voltage $V_A$, no excessive bias is applied. For this reason, the current value does not reach a threshold $I_F$.

If the upper limit of the variation range of threshold voltage $V_{ON}$ is represented by $V_M$ in FIG. 6, $V_M$ is determined by $C_T$ and $C_S$:

$$V_M = C_S V_B (C_S + C_T)$$

According to this equation, $V_M$ can be increased by increasing $V_B$.

With the above operation, a sufficient bias can be applied regardless of local variations in $V_{ON}$. In addition, the generated current can be controlled.

As described above, according to the present invention, biases and pulses are applied to the medium. However, these biases and pulses can be applied from the probe side in the same manner as described above by only changing the output terminal of the circuit in FIG. 4 from the medium to the probe.

An example of the embodiment of the present invention will be described next.

In this embodiment, an experiment in a recording/reproducing operation was conducted by using the pulse applying mechanism of the present invention.

A polyimide Langmuir-Blodgett (LB) film stacked on an Au electrode was used as a recording medium, and the bias applying circuit of the present invention was used to apply a bias voltage to the medium, thereby recording information thereon.

As power supply voltage $V_B$ in FIG. 4, 10 V was set. As the capacitance of the charge storage capacitor $C_S$, 5 pF was set. The parasitic capacitance $C_T$ was 1 pF or less.

From these discharging times, the measured pulse applying time was about 50 μsec. The ON/OFF timings of SW1 and SW2 were set in the switch timing control circuit 201 in accordance with this measured time, and a pulse was applied.

In a read operation, the voltage $V_B$ was set to a read voltage of 2.5 V, and a read operation was designated to the switch timing control circuit 201, thus closing both SW1 and SW2 and applying a DC bias to the medium.

When character information and image information were recorded and reproduced with the above settings, it was confirmed that the error rate was reduced to 1/10 that in the prior art.

When the electrical shapes of the recorded bits were observed with a scanning tunneling microscope, it was confirmed that no bit-destroying phenomenon had occurred, and variations in bit size and position were about 0.1% of the bit size.

As has been described above, according to the present invention, in recording information, the charges stored in the charge storage means are output to the probe or a recording medium after the charge storage means is disconnected from the DC power supply. With this arrangement, when a pulse is to be applied, a bias and a current can be controlled in accordance with the local characteristics of the medium at the pulse applying position. This operation allows stable recording in terms of bit shape and position, and can greatly decrease the error rate in a recording/reproducing operation.

In addition, since a voltage can be controlled by using only the capacitors, no complicated circuit system for applying pulses is required. Assume that in a system designed to apply a bias from the probe side, a plurality of probes are prepared, and the same medium can be accessed by the probes to greatly increase the transmission rate. Even in this case, since the arrangement of the system is very simple, the process load can be reduced in manufacturing probes by a semiconductor process including micromechanics and the like. In addition, the cost of each probe can be reduced, and the mounting density of probes can be increased.

In an information recording/reproducing operation, since bits are formed stably in terms of bit shape and position, the read error rate can be reduced without using any strong tracking mechanism. In addition, no redundant bits for error correction are required, and hence the system load in an encoding/decoding operation can be reduced. Furthermore, the recording density can be increased.

What is claimed is:

1. An information recording apparatus, comprising:
    a probe disposed in a position opposed to a recording medium;
    a capacitor;
    a first switch arranged between, and connecting, said probe and said capacitor;
    a DC power supply supplying charge to said capacitor;
    a second switch, arranged between and connecting said capacitor and said DC power supply; and a control circuit controlling opening and closing motion of said first and second switches with reference to a recording signal, wherein said control circuit first sets said second switch closed when said first switch is open so that the charge supplied from said DC power supply is stored in said capacitor, and then said control circuit turns said second switch open and turns said first switch closed so that the charge stored in said capacitor is applied as a voltage between said probe and said recording medium, thereby recording information.

2. An information recording apparatus according to claim 1, wherein the recording medium comprises an organic film.

3. A method of recording information using an information recording apparatus that comprises a probe disposed in a position opposed to a recording medium, a capacitor, a first switch arranged between and connecting the probe and the capacitor, a DC power supply suppling charge to the capacitor, a second switch, arranged between and connecting the capacitor and the DC power supply, and a control circuit controlling opening and closing motion of the switches in response to a recording signal; said method comprising the steps of:

setting the first switch open and the second switch closed by means of the control circuit, thereby storing the charge supplied from the DC power supply in the capacitor; and turning the second switch open and the first switch closed, by means of the control circuit, thereby applying the charge stored in the capacitor as a voltage between the probe and the recording medium to record information.

4. A method of recording information according to claim 3, wherein the recording medium comprises an organic film.

* * * * *

UNITED STATES PATENT AND TRADEMARK OFFICE
CERTIFICATE OF CORRECTION

PATENT NO.   : 6,040,848
DATED        : March 21, 2000
INVENTOR(S)  : SHUNICHI SHIDO, ET AL.

It is certified that error appears in the above-identified patent and that said Letters Patent is hereby corrected as shown below:

COLUMN 1:

Line 32, "level" should read --"level, and--.

COLUMN 4:

Line 9, "JT" should read --$J_T$--; and
    Line 56, "the SW2" should read --SW2--.

COLUMN 7:

Line 7, "suppling" should read --supplying--.

Signed and Sealed this

Third Day of April, 2001

Attest:

NICHOLAS P. GODICI

*Attesting Officer*      Acting Director of the United States Patent and Trademark Office